(12) United States Patent
Bartsch (10) Patent No.: US 10,922,113 B2
(45) Date of Patent: Feb. 16, 2021

(54) METHOD FOR VEHICLE BASED DATA TRANSMISSION AND OPERATION AMONG A PLURALITY OF SUBSCRIBERS THROUGH FORMATION OF VIRTUAL MACHINES

(71) Applicant: VOLKSWAGEN AKTIENGESELLSCHAFT, Wolfsburg (DE)

(72) Inventor: Patrick Bartsch, Wolfsburg (DE)

(73) Assignee: Volkswagen AG

( * ) Notice: Subject to any disclaimer, the term of this patent is extended or adjusted under 35 U.S.C. 154(b) by 71 days.

(21) Appl. No.: 15/115,820

(22) PCT Filed: Feb. 4, 2015

(86) PCT No.: PCT/EP2015/052244
§ 371 (c)(1),
(2) Date: Aug. 1, 2016

(87) PCT Pub. No.: WO2015/117982
PCT Pub. Date: Aug. 13, 2015

(65) Prior Publication Data
US 2017/0010910 A1    Jan. 12, 2017

(30) Foreign Application Priority Data
Feb. 4, 2014  (DE) .................. 10 2014 201 954

(51) Int. Cl.
*G06F 9/455*  (2018.01)
*G06F 9/54*   (2006.01)
*H04L 29/06*  (2006.01)

(52) U.S. Cl.
CPC ........... *G06F 9/45558* (2013.01); *G06F 9/54* (2013.01); *H04L 67/42* (2013.01); *G06F 2009/45595* (2013.01)

(58) Field of Classification Search
CPC ................ G06F 9/54; G06F 9/45558; G06F 2009/45595; H04L 67/42
See application file for complete search history.

(56) References Cited

U.S. PATENT DOCUMENTS 5,794,164 A * 8/1998 Beckert .................. B60R 11/02
                                                         455/3.06
5,852,747 A * 12/1998 Bennett ............. G06F 17/30171
                                                         707/E17.007

(Continued)

FOREIGN PATENT DOCUMENTS

CN     102549977 A    7/2012
DE     10044891 A1    3/2002

(Continued)

OTHER PUBLICATIONS

Connected: An Internet Encyclopedia. "NFS Protocol Overview". Available Feb. 9, 2005. Accessed at "https://www.freesoft.org/CIE/Topics/115.htm" (Year: 2005).*

(Continued)

*Primary Examiner* — Meng Ai T An
*Assistant Examiner* — Michael W Ayers
(74) *Attorney, Agent, or Firm* — Barnes and Thornburg LLP (57) ABSTRACT

A method for transferring data between at least two subscribers, at least one of the subscribers being located in a vehicle, the at least one vehicle-based subscriber providing at least one virtual machine or being configured as a virtual machine, the at least one virtual machine forming a server in a client-server communications network. Also disclosed is a communications network, a subscriber, and a vehicle.

15 Claims, 4 Drawing Sheets

(56) References Cited

U.S. PATENT DOCUMENTS

| | | | |
|---|---|---|---|
| 6,505,241 B2* | 1/2003 | Pitts | G06F 12/0813 709/203 |
| 2001/0037460 A1* | 11/2001 | Porcari | G06F 16/93 726/28 |
| 2003/0037173 A1* | 2/2003 | Pace | G06F 8/60 719/310 |
| 2009/0049175 A1* | 2/2009 | Finn | H04L 12/462 709/226 |
| 2010/0030466 A1 | 2/2010 | Rogers et al. | |
| 2010/0235430 A1* | 9/2010 | Kim | H04M 1/72522 709/203 |
| 2010/0325284 A1* | 12/2010 | Heim | H04L 67/141 709/227 |
| 2011/0004878 A1* | 1/2011 | Divoux | G06F 9/4856 718/1 |
| 2011/0276964 A1* | 11/2011 | Ogawa | G06F 13/385 718/1 |
| 2012/0275328 A1 | 11/2012 | Iwata et al. | |
| 2013/0036427 A1 | 2/2013 | Chen et al. | |
| 2014/0075438 A1* | 3/2014 | He | G06F 9/45533 718/1 |
| 2014/0122562 A1* | 5/2014 | Turner | G06F 16/951 709/203 |
| 2015/0012918 A1* | 1/2015 | Derrin | G06F 9/45558 718/1 |
| 2015/0012973 A1* | 1/2015 | Derrin | G06F 9/45533 726/4 |
| 2015/0379150 A1* | 12/2015 | Duda | G06F 17/30876 707/736 |
| 2016/0077789 A1* | 3/2016 | Hampiholi | H04W 76/14 709/203 |
| 2016/0112673 A1* | 4/2016 | Feng | H04N 7/147 348/14.08 |
| 2016/0364200 A1* | 12/2016 | Beveridge | G06F 3/1454 |
| 2016/0366229 A1* | 12/2016 | Yamaura | H04W 12/0609 |

FOREIGN PATENT DOCUMENTS

| | | |
|---|---|---|
| DE | 69820900 T2 | 11/2004 |
| DE | 10323936 A1 | 1/2005 |
| DE | 102004013629 A1 | 10/2005 |
| DE | 69732900 T2 | 3/2006 |
| DE | 60313373 T2 | 1/2008 |
| DE | 60316213 T2 | 5/2008 |
| DE | 112011100166 T5 | 10/2012 |
| DE | 102011077429 A1 | 12/2012 |
| WO | 2011042355 A1 | 4/2011 |

OTHER PUBLICATIONS

Techterms.com definition of UDP. https://techterms.com/definitions/udp Accessible 2007 (Year: 2007).*

Fielding; Architectural Styles and the Design of Network-based Software Architectures: Representational State Transfer (REST); Doctoral Dissertation; 2000; Chapter 5; University of California, Irvine; downloaded from http://www.ics.uci.edu/~fielding/pubs/dissertation/rest_arch_style.htm.

Search Report for German Patent Application No. 10 2014 201 954.0; dated Oct. 31, 2014.

Search Report for International Patent Application No. PCT/EP2015/052244; dated May 6, 2015.

* cited by examiner

METHOD FOR VEHICLE BASED DATA TRANSMISSION AND OPERATION AMONG A PLURALITY OF SUBSCRIBERS THROUGH FORMATION OF VIRTUAL MACHINES

PRIORITY CLAIM

This patent application is a U.S. National Phase of International Patent Application No. PCT/EP2015/052244, filed 4 Feb. 2015, which claims priority to German Patent Application No. 10 2014 201 954.0, filed 4 Feb. 2014, the disclosures of which are incorporated herein by reference in their entirety.

SUMMARY

Illustrative embodiments relate to a method for data transmission between at least two subscribers, to a communication network, to a subscriber in a communication network for data transmission, and to a vehicle.

BRIEF DESCRIPTION OF THE DRAWINGS

Disclosed embodiments are explained in more detail on the basis of the drawings, in which.

DETAILED DESCRIPTION OF THE DISCLOSED EMBODIMENTS

In today's communication networks in vehicles, subscribers in the communication network have stateful interfaces, particularly subscribers in what is known as an infotainment system. Data transmission by means of these stateful interfaces requires exact compliance with call sequences. Hence, a resultant disadvantage is tight communication-oriented interlocking of the subscribers which makes distribution of functions and functionalities in the communication network more difficult and restricts a multiclient capability of the communication network.

US 2010/0030466 A1 discloses a method for navigation outside a vehicle, wherein a navigation device receives route information that concerns a route from a start to a destination. In this case, the route information is determined outside the navigation device and comprises vehicle properties. The route information is stored in the navigation device. Further, the vehicle is guided to the destination on the basis of the route information. Further, a deviation state is detected in which the vehicle has left the route. Further, a route request that comprises the vehicle properties is sent to a server. In this context, however, the document does not disclose details regarding the flow of communication between the navigation device and the server. Further, the server is arranged outside the vehicle.

DE 100 44 891 A1 discloses a method for operating a multifunctional menu-guided display device in a motor vehicle, in which selection of a menu item displays or re-displays a function or a parameter in each case. In this context, the data content of displays of different units of the motor vehicle is stored in a function- and/or unit-related manner in a controller that corresponds bidirectionally with the display device. When the menu item is selected, only a header line of a memory content is initially displayed, with, subsequently, appropriate pushbutton switch operation transmitting and displaying the entire memory content, related to the header line. This results in a data transmission that comprises multiple transmission processes.

DE 10 2004 013 629 A1 discloses a communication system for a motor vehicle. The communication system is used to transmit a piece of information relating to operation of the motor vehicle from a sending controller to a receiving controller, wherein the communication system comprises a bus system. Further, the communication system comprises an interface, which is independent of the disclosed embodiment of the bus system, for inputting the information transmitted via the bus system and/or outputting the information to be transmitted via the bus system, which information relates to operation of the motor vehicle. This document also discloses no details regarding the flow of the data transmission.

DE 603 13 373 T2 discloses an interactive vehicle control system having a control unit that is connected to at least one vehicle device via a first connection means. A further disclosure is at least one client device that is connected to the control unit via a second connection means, whereon the user interacts. Further, the control unit comprises a transfer protocol server that transmits at least one man/machine interface to the client device. This document also discloses no details regarding the flow of the data transmission.

The publication "Fielding, Roy Thomas. Architectural Styles and the Design of Network-based Software Architectures. Doctoral dissertation, University of California, Irvine, 2000", retrievable at www.ics.uci.edu/~fielding/pubs/dissertation/rest_arch_style.htm, describes a representational state transfer (REST).

DE 11 2011 100 166 T5 discloses a method for starting a virtual entity within a cloud computing environment. In this context, a virtual machine is held only in the cloud computing environment, however.

DE 698 20 900 T2 discloses a system and a method for a distributed computer motor vehicle service facility or outlet. DE 603 16 213 T2 discloses network-centered telematics services and applications that are intended for vehicles, and particularly a telematics system that is configured to ensure storage of user preferences. In both documents, servers are arranged exclusively outside the vehicle.

It is desirable for applications that particularly have not been developed by a vehicle manufacturer also to be furnished in the vehicle retrospectively in future.

The technical problem that arises is that of providing a method for data transmission, a communication network, a subscriber in a communication network and a vehicle that simplify the retrospective provision and execution of a multiplicity of different applications and services in the vehicle. The technical problem that arises is that of allowing retrospective involvement of external data, but data that are required to be held persistently, without impairing an operability of the vehicle or of individual subsystems of the vehicle.

One proposal relates to a method for data transmission between at least two subscribers. In this context, at least one of the subscribers may be a vehicle-based subscriber. This means that at least one of the subscribers is arranged in the vehicle and particularly can communicate with further vehicle-based subscribers. The vehicle-based subscriber may particularly be a controller of the vehicle, for example, a controller of an infotainment system of the vehicle, or can be provided by such a controller. The at least one further subscriber may particularly be an external subscriber, an external subscriber being arranged outside the vehicle.

Vehicle-based can further mean that the vehicle-based subscriber is permanently installed in or on the vehicle. By way of example, the vehicle-based subscriber may be mechanically permanently connected to a part of the vehicle.

A vehicle may be a motor vehicle, particularly an automobile. Hence, the vehicle-based subscriber is arranged in or on the motor vehicle.

A data transmission between the two subscribers can be effected via any data link, for example, a wired data link, but optionally via a wireless connection or a local, device-internal or subscriber-internal connection.

The at least one vehicle-based subscriber provides at least one virtual machine or forms a virtual machine. A virtual machine can be provided, e.g., by a hypervisor. In this context, a virtual machine can denote a computation device that is not embodied directly or immediately on a piece of vehicle-based hardware. In this case, the computation device may be a device-internal computation device. The virtual machine particularly allows an operating system to be provided or to be simulated that is different than an operating system of the vehicle-based subscriber. The virtual machine can be used to provide an Android™ operating system, for example.

The virtual machine can provide a runtime environment for executing applications or services, with execution of the software code directly via the vehicle-based subscriber, that is to say particularly without a virtual machine, not being possible.

Within the context of the disclosed embodiments, the term "service" denotes a piece of software or a portion of a piece of software, with one or more functions being performable when the instructions encoded by the software are executed. The service therefore provides one or more functionalities. In this context, a piece of software can denote a computer program or portions thereof.

In contrast to an application that is explained below, the functions of a service are not controllable, in particular, initiatable, on their own, i.e., without further software portions. The functions of a service may not be controllable, in particular, initiatable, on their own by a user. Alternatively or cumulatively, information generated during the execution of the service cannot be transmitted to a user on its own, i.e., without further software portions. The service particularly implements no man/machine interface. However, the service can contain at least one software interface, particularly what is known as an API, for connecting a piece of user software. Such a software interface may be a stateless interface. This is explained in more detail below. Such a piece of user software can particularly implement the man/machine interface. In this context, implement can mean that the user software realizes the man/machine interface.

Within the context of the disclosed embodiments, the term "application" denotes a piece of software or a portion of a piece of software, one or more functions being performable when the instructions encoded by the software are executed, and the functions of the application being controllable, in particular, initiatable, on their own, i.e., without further software portions. The functions of the application may be controllable, in particular, initiatable, on their own by a user. Alternatively or cumulatively, information generated during the execution of the service can be transmitted to a user on its own. The application particularly implements a man/machine interface.

An application can therefore implement a function portion and a man/machine interface, a service being able to implement only a function portion but not a man/machine interface. The man/machine interface can particularly be provided such that the encoded functionalities are controllable, e.g., initiatable, by a user using the man/machine interface. Further, the man/machine interface can be used to provide, e.g., to visually or audibly provide, information to a user, the information having been generated during the execution of the application or of the service. By way of example, data for presenting a user interface on a display device, for example, a touch screen, can be generated. Further, the man/machine interface can be used to evaluate user inputs. By way of example, user inputs on a touch screen can be evaluated.

In this context, the man/machine interface can be provided at least in part on an existing or by an existing device, for example, a vehicle-based or external touch screen. At least one hardware portion of the man/machine interface can be provided at least in part by the existing device. It goes without saying that in this case it is also possible for the relevant control and evaluation device to be provided for direct actuation and/or evaluation of the man/machine interface by the existing device.

In this case, an application can directly control a mode of the hardware portion, while a service only comprises a software interface for connection of a piece of operating software for the hardware portion.

Further, within the context of the disclosed embodiments, an "HMI client" denotes a piece of software or a portion of a piece of software that implements a man/machine interface. In this context, the term "HMI client" can also denote a device or hardware portion for executing this software. The "HMI client" can further comprise particularly a software interface for communication with a service, particularly a stateless software interface. Hence, a stateless communication is possible between the service and "HMI client".

In this context, the "HMI client" can be executed on a vehicle-based or external device. By way of example, an HMI client can be executed on an external mobile telephone, a tablet PC or what is known as a smart watch. It is possible for the service to be executed by the virtual machine, with the man/machine interface being executed via the HMI client. In this case, the HMI client can have suitable interfaces for communication, in particular, stateless communication, with the virtual machine.

Purely by way of example and without a limiting effect, the terms "service", "application" and "HMI client" can be illustrated as follows. A telephone book service can provide the functionalities of an electronic telephone book, for example, particularly the suitable storage and management of contact data. However, the telephone book service does not implement a man/machine interface that can be used to display existing contacts or to input new contacts. For such a telephone book service, a man/machine interface that can be used to display existing contacts or to input new contacts can be implemented by an HMI client that is executable on a mobile telephone, particularly a smartphone, for example.

A telephone book application can implement both the functionalities of the electronic telephone book and the man/machine interface that can be used to display existing contacts or to input new contacts.

According to the disclosed embodiments, the at least one virtual machine forms a server in a client/server communication network. The virtual machine can form a server for communication, that is to say a data transmission, between the virtual machine and a further subscriber in the client-server communication network. In this case, the further subscriber can form a client or else a further server. As explained in more detail below, persistent data can be transmitted from the further subscriber to the virtual machine. It goes without saying that it is also possible for temporary data to be transmitted from the further subscriber to the virtual machine, however. In this context, temporary data denote data that are useable on the vehicle following the transmission, but are held only temporarily, that is to say not permanently. Temporary data can be transmitted as part of a video or audio streaming, for example.

In this context, the client-server communication network may be arranged purely on the vehicle, with the client-server communication network comprising exclusively subscribers arranged on the vehicle. However, it is also possible for the client-server communication network to comprise external subscribers too.

That the at least one virtual machine forms a server means that the virtual machine has or provides a corresponding server functionality. However, it is not out of the question for the at least one virtual machine to additionally also be able to form a client, that is to say also to be able to have or provide a corresponding server functionality. This is explained in more detail below.

A server can execute particularly a service as explained above or the functions encoded by the service, with the further subscriber, particularly a further subscriber may be an HMI client, being able to execute a man/machine interface that allows the control of functionalities of the service by the user. A server may also be able to execute an application or the functions encoded by the application, however.

The proposed method allows applications and particularly services to be able to be executed independently of an operating system of the vehicle-based subscriber in the vehicle. This independence allows uncomplicated and simple, particularly also retrospective, involvement of a multiplicity of these applications and services, particularly also of different users.

In a further disclosed embodiment, the at least one further subscriber transmits persistent data to the at least one virtual machine. In this context, persistent data denote data that are usable on the vehicle following the transmission and are held not temporarily but rather permanently. Persistent data can be held on the vehicle up until active uninstallation. The persistent data may particularly be data that encode an application that is usable and/or executable on the vehicle following the transmission. Such applications can also be referred to as apps, for example.

Purely by way of example and without a limiting effect, persistent data may also be video data, however, that are provided for repeated playback.

The virtual machine can particularly be used to perform resource management for the persistent data. This means that the vehicle-based resources that are needed and demandable by the persistent data or the content or applications encoded by the persistent data, for example, a memory requirement and/or a computation power, are managed by means of the virtual machine. Alternatively or cumulatively, the virtual machine can be used to perform lifecycle management for the persistent data or for the content or applications encoded by the persistent data. Lifecycle management comprises particularly installation, update and uninstallation of the persistent data.

On the vehicle, persistent data that are not yet present can be transmitted from the at least one further subscriber to the at least one virtual machine.

Hence, a simple interface is provided that allows retrospective introduction of persistent data that have been generated particularly by external providers, with an operability of already present vehicle-based applications or services being impaired minimally or not at all. By way of example, the persistent data can be used to provide new applications or services on the vehicle. If an error occurs during the execution of such an application, then the error can be intercepted on account of the virtual machine that executes the new application or manages the resources and lifecycle thereof.

In a further disclosed embodiment, the persistent data encode a service or an application. In this case, the service or the application, or the instructions encoded in the corresponding software, can be executed by means of the virtual machine. Hence, the virtual machine manages access by the application or services encoded by the persistent data to further vehicle-based resources, and vice versa. Hence, it is possible for an application or service that is not present on the vehicle to be furnished, particularly by an external provider, in the vehicle, particularly a vehicle occupant.

Such an application or service that is not present may be, by way of example, a music management application or service that is not present, a contact management application or service that is not present, a travel guide application or service that is not present, a driver's logbook application or service that is not present or a diary management application or service that is not present.

In a further disclosed embodiment, the at least one virtual machine forms a client in the client-server communication network.

This can mean that the virtual machine can also provide a client functionality in addition to a server functionality.

By way of example, the at least one virtual machine can provide a client for performing a particular operation. During the performance of a further operation, the at least one virtual machine can provide a server. On the basis of the persistent data, particularly a content, service or application encoded by the persistent data, the virtual machine can form exclusively a server or exclusively a client in the client-server communication network.

In another disclosed embodiment, stateless communication between a subscriber that forms a server and a subscriber that forms a client is effected in the client-server communication network. It is thus possible to use a data transmission between a first subscriber, particularly of the virtual machines, and at least one further subscriber to effect a stateless communication. Alternatively, the virtual machine can also form the at least one further subscriber.

In this context, stateless means that data from a complete client-based request and/or data from a complete server-based response are transmitted in precisely one transmission process in each case. In this context, the server-based response may be a response to the client-based request, such a response being able to be referred to as a corresponding response. Inter alia, stateless can also mean that all information that is required for executing at least one server-based operation is transmitted from the client to the server in precisely one transmission process. Further, stateless can mean that all information that is required for executing at least one client-based operation is transmitted from the server to the client in precisely one transmission process. Further, stateless can also mean that all information that is required for confirming an operation requested by a server is transmitted from the client to the server in precisely one transmission process. Further, stateless can also mean that all information that is required for confirming an operation requested by a client is transmitted from the server to the client in precisely one transmission process. This means that it is no longer necessary for a client-based request and a server-based response to be transmitted in a sequence comprising multiple transmission processes, as customary to date. In this context, a single transmission process denotes a portion of an overall sequence that is required for synchronizing the states in client and server.

Requests, particularly client-based requests, may in this context be, e.g., a read request, a write request or an erase request, which initiate a read operation, a write operation or an erase operation, respectively, on the server or on the client. In this context, a write request may be a generate request or an update request.

Stateless can also mean that the subscribers can execute operations on the basis of the information transmitted in the one transmission process and require no further knowledge, particularly no further knowledge about previously effected communication processes and/or the information transmitted therein.

Stateless can also mean that the provision of data for the communication is effected regardless of the state of the communication partner. Stateful, that is to say the opposite of "stateless", can mean that the provision of data for the communication is effected on the basis of a state of the communication partner, this state needing to be checked prior to provision.

Stateless can therefore allow a communication between a server and a client for which there is no need for the server to log onto the client. Instead, a client can be transmitted all information that are required for confirming or performing an operation requested by a server from the client to the server in precisely one transmission process.

A stateless communication can be achieved when the communicating subscribers and a transmission protocol are in the form such that the stateless communication explained above is performable.

The first subscriber may be, as an alternative to the virtual machine, a controller in the vehicle, particularly a controller of an infotainment system in the vehicle, or can be provided by such a controller, wherein the controller provides data that or whose content are/is transmitted to a vehicle occupant via an appropriate output device. By way of example, these data can be generated in the controller or stored in the controller, for example, in a memory device of the controller.

The further subscriber may be in the form, e.g., of an output device in the vehicle or can be provided by such an output device. By way of example, an output device may be a display device, for example, a display, or an acoustic reproduction device, for example, a loudspeaker. It goes without saying that the output device may in this context also comprise a device for controlling the output device, wherein the device for controlling the output device actuates the relevant output device such that data or the content of the data are/is output as desired. Thus, the control device of a display device can actuate the display device on the basis of information that is to be displayed.

As explained in more detail below, the subscribers in the client-server communication network can each form or have communication interfaces that allow the proposed data transmission for stateless communication. Such communication interfaces can also be referred to as state-free communication interfaces.

The method for data transmission can particularly be effected according to the RESTful principle (Representational State Transfer principle). In accordance with which principle, resources are provided in the client-server communication network, with a resource containing a particular piece of information or a particular service. Each resource is referenced with a global identifier.

The proposed data transmission can be used to transmit particularly data, i.e., objects or object lists. However, it goes without saying that binary data are also able to be transmitted. It is thus possible for, e.g., data that encode precisely one object or precisely one object list to be transmitted, e.g., from the first to the further subscriber in precisely one transmission process. The data transmission can also be used for transmitting requests and for transmitting status information, however.

This results in a simplified communication between a client and a server, particularly between multiple clients and a server, since a data transmission that relates to a particular process, e.g., a write operation, needs no more than two transmission processes, namely from the client to the server (request) and from the server to the client (response). However, it is also possible for data relating to a particular process to be transmitted in a single transmission process, particularly from the server to the client. This is explained in more detail below.

In a further disclosed embodiment, a communication between a subscriber that forms a server and a subscriber that forms a client is effected in the client-server communication network in accordance with the RESTful principle. This means that the client-server communication network forms a RESTful system. Besides the property of statelessness explained above, a communication in accordance with the RESTful principle can also have at least one of the further properties: scalability of the subscribers and of the possible interactions between subscribers, classification of messages as buffer-storable/non-buffer-storable, standard communication interfaces, multilayer nature of the system. These properties are described particularly in the publication "Fielding, Roy Thomas. Architectural Styles and the Design of Network based Software Architectures. Doctoral dissertation, University of California, Irvine, 2000", retrievable at www.ics.uci.edu/~fielding/pubs/dissertation/rest_arch-_style.htm.

In another disclosed embodiment, the data transmission between the at least two subscribers is effected in accordance with a transmission protocol from a set of at least two different transmission protocols. The data transmission can be effected in accordance with a transmission protocol from a set of precisely two transmission protocols. Each transmission protocol from the set of different transmission protocols allows the stateless communication explained above or the communication in accordance with the RESTful principle.

Hence, it is possible for a data transmission to be effected in one transmission process either in accordance with a first transmission protocol or in accordance with a further transmission protocol.

The data transmission can be effected via precisely one communication channel or via precisely one communication link, the communication channel/the communication link allowing the data transmission in accordance with each of the transmission protocols. It is also possible for different communication channels/communication links to be provided for data transmission in accordance with different transmission protocols.

In each of the different transmission protocols, it is possible for particular authorizations to be stipulated for each of the subscribers, particularly authorizations for predetermined requests.

This results in different data transmissions, particularly data transmissions for different reasons, being able to be effected in accordance with different transmission protocols.

In another disclosed embodiment, a data transmission that is initiated by a client-based request is effected in accordance with a first transmission protocol. In this context, the client-based request may already form a first partial transmission process for the data transmission. By way of example, the client-based request can be used to retrieve status information or content information. The client-based request may be a read request, write request or erase request as explained above. A corresponding server-based response to the client-based request can likewise be transmitted in accordance with the first transmission protocol in this context. By way of example, it is thus possible for data to be transmitted from the server to the client on the basis of a read request from the client.

Further, a data transmission that is initiated by a server-based event is effected in accordance with a further transmission protocol, the further transmission protocol being different than the first transmission protocol. By way of example, a server-based event can arise when two temporally successive, but like, read requests to the server would generate different responses. A data transmission in one transition process in accordance with the further transmission protocol thus requires no client-based request. As explained in more detail below, this may require a client-based registration request, however.

The data transmission in accordance with the first transmission protocol can also be referred to as what is known as polling, while the data transmission in accordance with the further transmission protocol can also be referred to as pushing. This results in a method for data transmission in which client-based requests, in particular, cyclic unilateral requests, are not absolutely necessary to capture server-based events promptly.

Further, the first transmission protocol may be a REST/http protocol and the further transmission protocol may be a ws protocol. In this context, a REST/http protocol denotes a representational state transfer protocol and a ws protocol denotes a websocket protocol. This results in a simple implementation of different protocols.

Further, the data transmission to the at least one further subscriber on the basis of a server-based event can be effected only if the at least one further subscriber has registered for the event by means of a registration request. A registration request denotes a client-based request on the basis of which a logon or logoff operation for a notification function for notifying the client on one or more server-based events is performed on the server. In a logged on state, the event-initiated data transmission from the server to the client, as explained above, is effected if such a server-based event occurs. In a logged off state, no event-initiated transmission from the server to the client is effected if such a server-based event occurs. This results in an event-initiated data transmission being effected only to particular clients, which reduces a transmitted volume of data.

Further, at least one data format for the data transmission may be the same for all transmission protocols. This means that a data format for requests and/or responses is the same in the transmission protocols used. Requests and/or responses are thus of the same design regardless of the transmission protocol. This results in a simplified implementability of the proposed method.

Further, an addressing structure may be the same for all transmission protocols. This means that addresses contained in requests and/or responses, e.g., addresses of data objects, status objects and/or object lists in the transmission protocols used, are the same. Addresses are thus of the same design regardless of the transmission protocol. It is possible for, e.g., a maximum, addressing depth, that is to say a number of possible address levels, to be the same for all transmission protocols. This likewise results in a simplified implementability of the proposed method.

Further, a client-based request and/or a registration request may be parameterized. Parameterized means that at least one parameter in a client-based request and/or in a registration request is transferred to the first subscriber (server). This parameter can be used particularly for filtering. In this context, a response or multiple responses can be filtered from a number of possible responses on the basis of the filter parameter. If no parameter is transferred, then an unfiltered response can be provided, for example, all possible responses can be transmitted.

If the client-based request and/or the registration request is directed over requesting an object list, then the parameter chosen can be an address interval (a position of the entry in a list) and/or a number of objects to be transmitted, for example. This therefore allows the transmission of a desired segment of objects from the object list.

A further parameter may be a reference depth parameter, for example. If a response requested at a first address, for example, a requested object, contains a reference to at least one further response that is addressed at a further address, for example, a reference to a further object, then it may be desirable for this further response likewise to be transmitted as part of the response to the client-based request and/or on the basis of a server-based event. In this context, the reference depth parameter indicates a number of referencing levels that are taken into account for the transmission. By way of example, the reference depth parameter can be limited to a maximum value, for example, to three.

A further filter parameter may be, e.g., an update frequency for periodic update responses that are transmitted from the server to logged on clients on the basis of a client-based registration request, for example. A further parameter may be a maximum update rate for event-initiated responses. If, e.g., a state or a property changes faster than the time stipulated by the maximum update rate, then a set of event-initiated responses can be limited. In this case, only the state that is current for the expiry of the period stipulated by the update rate can be transmitted, for example.

Further, the data transmission to the at least one further subscriber may be a filtered data transmission. In this context, filtered means that one or more responses are filtered from a number of possible responses to a client-based request and/or a registration request on the basis of at least one filter criterion, for example, on the basis of the at least one filter parameter explained above, and transmitted. This means that it is possible to reduce a set of data that are to be transmitted.

Further, data encoding a response can be transmitted, for example, data encoding an object. The data contain at least one reference to at least one further response, for example, at least one further object. In this context, the responses may differ in their respective addressing, for example. Further, the data encoding the at least one further response are additionally transmitted. As a result, a resolution of the reference is therefore effected, which means that the referenced response is also transmitted within a data transmission process in the stateless communication.

A further proposal relates to a communication network for data transmission between at least two subscribers, wherein at least one of the subscribers may be a vehicle-based subscriber.

In this context, the at least one vehicle-based subscriber provides at least one virtual machine.

According to the disclosed embodiments, the at least one virtual machine forms a server in a client-server communication network. This can mean that the virtual machine can provide a server in the client-server communication network. At least one further subscriber can transmit persistent and/or temporary data to the at least one virtual machine.

In this context, the communication network is such that the disclosed method is executable by means of the communication network. This results in the disclosed communication network allowing the execution of the disclosed method with the likewise cited benefits.

In a further disclosed embodiment, at least one further subscriber can transmit persistent data to the at least one virtual machine.

This provides a communication network that allows reloading of external, persistent content, with an operability of the vehicle not being impaired or being impaired only minimally.

In a further disclosed embodiment, the at least one virtual machine forms a client in a client-server communication network. The client-server communication network may, as explained above, be arranged exclusively on the vehicle. However, the client-server communication network may also be a part of the proposed communication network or may form it completely.

In this context, the communication network may comprise vehicle-based subscribers and external subscribers.

This can mean that the virtual machine can provide a server in the client-server communication network additionally a client.

In a further disclosed embodiment, a subscriber that forms a server and a subscriber that forms a client each provide or have a communication interface in the client-server communication network, wherein the communication interfaces are in a form such that the communication interfaces can be used to perform a stateless communication between the subscribers.

In a further disclosed embodiment, a subscriber that forms a server and a subscriber that forms a client each provide or have a communication interfaces in the client-server communication network, wherein the communication interfaces are in a form such that the communication interfaces can be used to perform a communication between the subscribers in accordance with the RESTful principle. This has been explained above.

The virtual machine explained above can thus form a communication interface in such a form.

A further proposal relates to a subscriber in a communication network for data transmission between at least two subscribers, wherein the subscriber may be a vehicle-based subscriber, wherein the vehicle-based subscriber can provide at least one virtual machine or can form a virtual machine. According to the disclosed embodiments, the at least one virtual machine forms a server in a client-server communication network.

In this context, the vehicle-based subscriber is such that the disclosed method is executable by means of the vehicle-based subscriber. Further, the vehicle-based subscriber may be a subscriber in a communication network according to one of the disclosed embodiments. The benefits arising from such a subscriber have already been explained above.

A further proposal relates to a vehicle, wherein the vehicle comprises a vehicle-based subscriber or a communication network according to one of the disclosed embodiments.

In the text that follows, like reference signs denote elements having like technical features.

Figure 1:
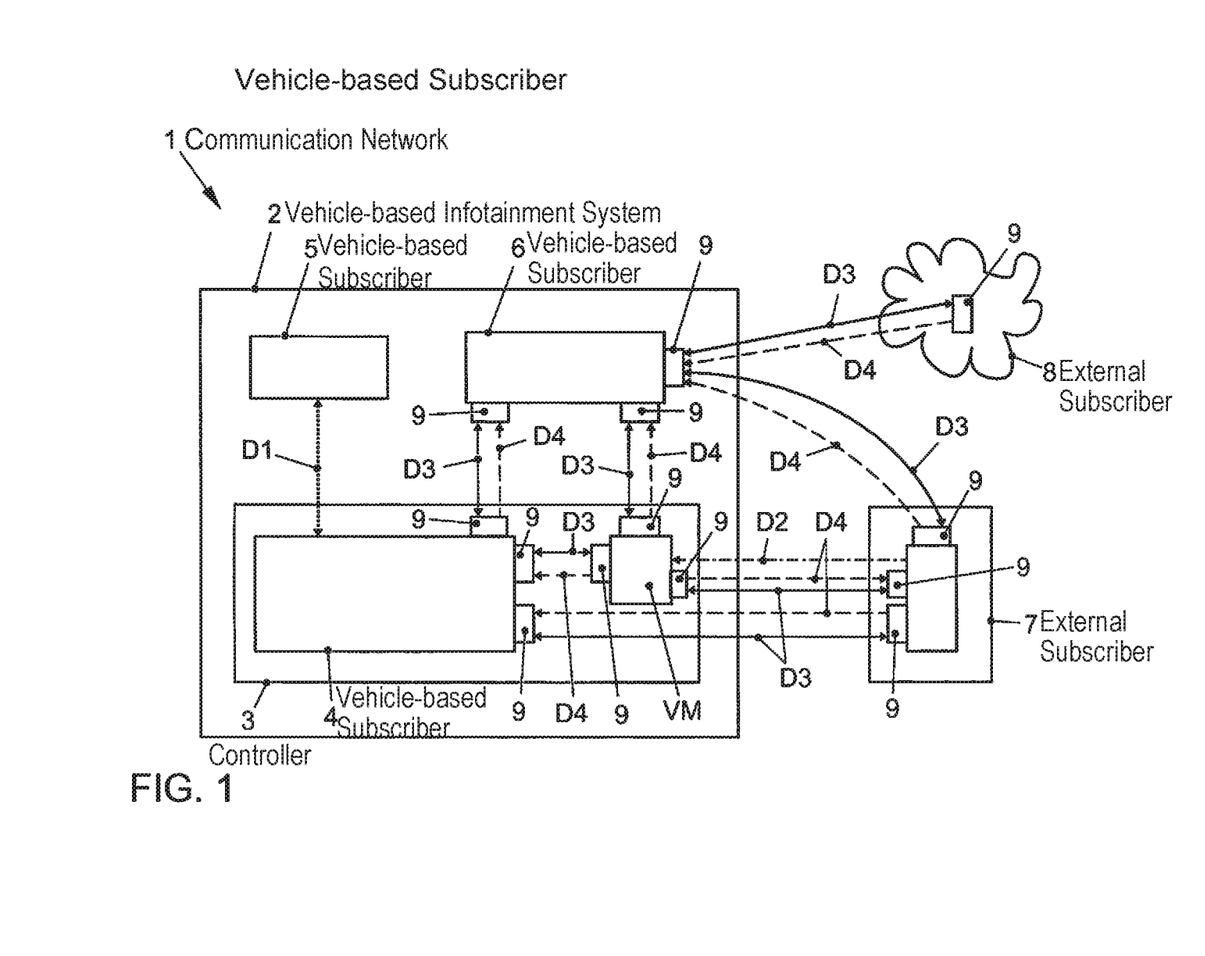
FIG. 1 shows a schematic block diagram of the disclosed communication network.

FIG. 1 shows a schematic block diagram of a communication network 1 according to the disclosed embodiments. It shows a vehicle-based infotainment system 2. The vehicle-based infotainment system 2 comprises a vehicle-based controller 3. The controller 3 provides a first vehicle-based subscriber 4. By way of example, the first vehicle-based subscriber 4 can transmit data to further subscribers as part of execution of applications that are already present in the vehicle, for example, applications installed in the factory or originally. In this context, a first data transmission D1 is represented by a dotted line, with the first data transmission D1 being used to transmit data between the first vehicle-based subscriber 4 and a second vehicle-based subscriber 5, wherein the second vehicle-based subscriber 5 forms or is provided by, e.g., a display control device for controlling a display device, not shown, wherein the display control device furnishes an application for presenting content. The first data transmission D1 can be effected in accordance with a native, that is to say originally installed, transmission protocol, for example.

The figure further shows a third vehicle-based subscriber 6. The third vehicle-based subscriber 6 may be a further display control device for controlling the display device, not shown. By way of example, the further display control device can furnish a browser, that is to say a further application for presenting content. In this context, the display control performed by the third vehicle-based subscriber 6 and the display control performed by the second vehicle-based subscriber 5 may be different than one another, however.

Further, the controller 3 provides a virtual machine VM. A second data transmission D2, which is represented by a dash-dot line, can be used to transmit persistent or temporary data that are not present on the vehicle from a first external subscriber 7, for example, a mobile telephone, to the virtual machine VM. By way of example, the data transmitted by means of the second data transmission D2 can encode an application or a service, wherein the application or the service requires an operating system for execution, which operating system is different than an operating system of the infotainment system 2, for example, an operating system of the first vehicle-based subscriber 4.

The virtual machine VM executes resource management and lifecycle management for the persistent data transmitted by the first external subscriber 7. Further, the application or service encoded by the external data is executed by the virtual machine VM.

The virtual machine VM may further form a server for a communication with the first external subscriber 7. It goes without saying that the VM can also execute further applications or services, or the instructions encoded in the corresponding software, the further applications or services not having been transmitted by the first external subscriber 7.

When the virtual machine VM executes an application, the virtual machine VM is also able, during the execution, to execute a man/machine interface or the functions thereof, the hardware portion of the man/machine interface being provided by the first external subscriber 7. By way of example, a touch screen of the first external subscriber 7 can be used as a display and operator control device for controlling functionalities of the application and for displaying information that is provided for the user by the application.

The man/machine interface may be implemented by the application and can be provided by the virtual machine VM during execution of the relevant software.

When the virtual machine VM executes a service, the virtual machine VM cannot execute a man/machine interface or the functions thereof, since the service does not implement the man/machine interface. In this case, a piece of software that is executable by the first external subscriber 7 can implement the relevant man/machine interface. The first subscriber 7 can form an HMI client. The service can comprise an appropriate software interface, particularly a stateless software interface, for connecting the man/machine interface, however.

The man/machine interface, particularly the touch screen, or the functions of the man/machine interface or touch screen, can be executed by the first external subscriber 7.

The data transmission between the virtual machine VM and the first external subscriber 7 during execution of an application or of a service can be effected as stateless communication via stateless communication interfaces 9.

The figure shows that the first vehicle-based subscriber 4, the third vehicle-based subscriber 6, the virtual machine VM and also the first external subscriber 7 and a further external subscriber 8 each have stateless communication interfaces 9. These stateless communication interfaces 9 can be used to perform a stateless communication, as explained above, between the respective subscribers 4, 6, 7, 8, VM. In this context, third data transmissions D3 are represented by a solid line and fourth data transmissions D4 are represented by a dashed line, the third data transmissions D3 representing request-initiated data transmissions and the fourth data transmissions D4 representing event-initiated data transmissions.

By way of example, the further external subscriber 8 may be or can provide a data cloud, with data that encode content being retrievable from the data cloud.

Figure 2:
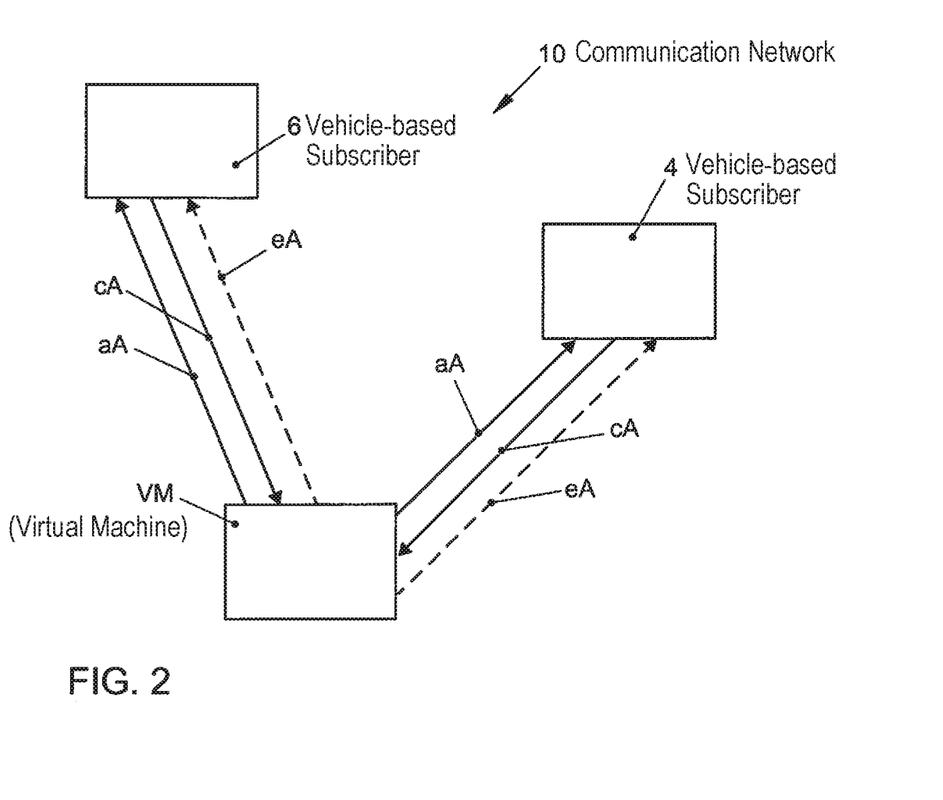
FIG. 2 shows a schematic block diagram of a client-server communication network.

FIG. 2 shows a schematic block diagram of a communication network 10 according to the disclosed embodiments. The communication network 10 comprises a virtual machine VM, i.e., a server; a first subscriber 4, i.e., a client; and a third subscriber 6, i.e., a client. In this context, the subscribers VM, 4, 6 provide or have communication interfaces, not shown, that can be provided by means of software and/or by means of hardware.

The interfaces of the subscribers VM, 4, 6 are used to effect a data transmission between the first and the virtual machine 4, VM and between the virtual machine VM and the third subscriber 6. In this context, the data transmission is used to effect a stateless communication between the first and the virtual machine 4, VM and between the virtual machine VM and the third subscriber 6.

Further, the figure schematically shows two transmission protocols, with a data transmission in accordance with a first transmission protocol being represented by a solid line and a data transmission in accordance with a second transmission protocol being represented by a dashed line. Hence, the third data transmission D3 explained above is effected in accordance with the first data transmission protocol and the fourth data transmission D4 is effected in accordance with the second transmission protocol. The first transmission protocol is a REST-http protocol and the further transmission protocol is a ws protocol.

The stateless communication is explained by way of example on the basis of the communication between the first subscriber 4 and the virtual machine VM. In a first disclosed embodiment, a client-based request cA is effected that is transmitted in one transmission process in accordance with the first transmission protocol. In this context, the client-based request cA is complete and thus contains all information that is required for performing a requested server-based operation. On the basis of the client-based request cA, e.g., after the server-based operation has been performed, a request-initiated response aA is transmitted in one transmission process, from the virtual machine VM to the first subscriber 4. In this context, the request-initiated response aA is complete and thus contains all information that the first subscriber 4 has requested, e.g., in the client-based request cA. In this context, both the client-based request cA and the request-initiated response aA form stateless partial transmission processes for a stateless question/response sequence that consists of precisely these two partial transmission processes.

Each client-based request cA can contain an address, an identifier (ID) and a name of a requested response, e.g., a requested object. In this context, the identifier may be particularly an identifier that is univocal in the communication network 10. Further, the client-based request cA can contain filter parameters.

It is possible, e.g., for the client-based request cA to be effected as a read request, erase request or write request, which means that different operations are performed in each case on the server. Depending on the nature of the request, particularly in the case of a read request, the request-initiated response aA is effected, which in turn contains all information that has been requested by the client-based request cA.

The figure further shows an event-initiated response eA, wherein a data transmission from the virtual machine VM to the first subscriber 4 is effected in precisely one transmission process in accordance with the further transmission protocol when a server-based event, that is to say an event on the virtual machine VM, occurs. FIG. 1 does not show a client-based registration request rA (see FIG. 3) by means of which the first and third subscribers 4, 6 each register for an event-initiated data transmission. The data transmission in accordance with the further transmission protocol is effected whenever two temporally successive read requests to the virtual machine VM having the same address would generate different request-initiated responses aA. A request-initiated response aA or an event-initiated response eA can be used to transmit status objects, data objects, binary data or object lists, particularly lists of data objects.

By way of example, addresses in the communication network may be designed as follows:

$$\text{address level 1/address level 2/address level 3} \qquad \text{formula 1}$$

wherein address level 1 can denote a service, for example, address level 2 can denote a particular resource, for example, and address level 3 can denote an identifier for a data or status object, for example. Client-based requests cA that contain only entries on address level 1 and possibly address level 2 can be provided with an object list as request-initiated response aA. Addresses that contain entries on all address levels can be provided with particularly a data or status object as request-initiated response aA.

In this context, a data object can contain an identifier, an address and a name of the data object. Further, a data object can contain a useful data component. Further, a data object can contain a piece of status information. Further, a data object can contain validation information for validating the subscriber 4, 6, VM generating the response. A response to a failed request for a data object can further contain error message information and/or an error code.

A status object can contain a piece of status information, a piece of error message information, an error code and/or an identifier.

Each data or status object can be transmitted with its identifier, its address and its name in each transmission process.

Data objects or object lists can be transmitted particularly on the basis of a read request, and status objects can be transmitted particularly on the basis of a write request or erase request.

Further, client-based requests cA or registration requests rA (see FIG. 4) may be parameterized. If an image to be presented is requested, for example, then parameters may comprise a desired image width, for example, a number of pixels, and a desired image height, for example, a number of pixels.

An address for a request may also contain, from a client to a server, an identifier for client-based elements as further information. On the basis of this identifier, a requested response can be transmitted only to particular elements of the relevant client, for example, of the first or third subscriber 4, 6.

Figure 3:
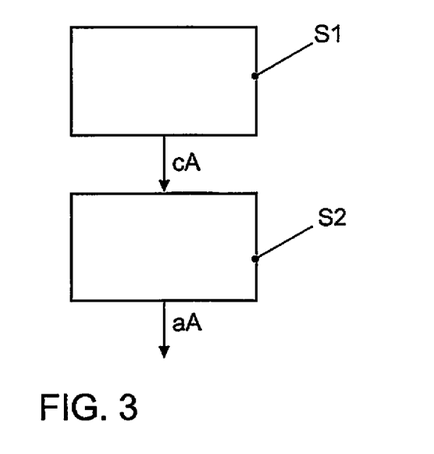
FIG. 3 shows a schematic flowchart for a stateless communication.

FIG. 3 shows a schematic flowchart for a method according to the disclosed embodiments. In a first operation at S1, a complete client-based request cA, for example, from the first or third subscriber 4, 6 (see FIG. 2), is generated and is transmitted to the virtual machine VM in one transmission process. In a second operation at S2, the virtual machine VM generates a complete corresponding request-initiated response aA and transmits it again to the requesting first or third subscriber 4, 6 in one transmission process. Depending on the request, the response may contain, e.g., a data object, a status object, binary data or an object list.

Figure 4:
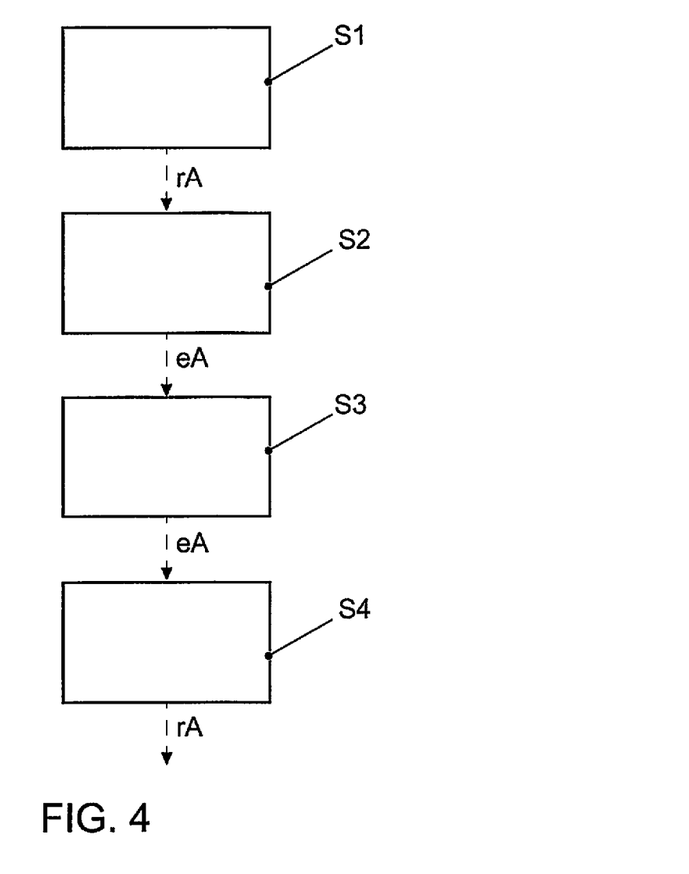
FIG. 4 shows a further schematic flowchart for a stateless communication.

FIG. 4 shows a further flowchart for a method according to the disclosed embodiments. In a first operation at S1, a client, for example, the first or third subscriber 4, 6 (see FIG. 2), generates a complete registration request rA and transmits it to the virtual machine VM in one transmission process. By way of example, the registration request rA may be a logon or logoff request. Such a registration request rA may contain, besides the nature of the request, an address for the requested response, e.g., for a requested data object, status object or object list, various parameters, for example, a parameter encoding a particular response parameter, a parameter encoding a repetition rate, a parameter encoding a maximum transmission rate, and further parameters. If the registration request rA is a logon request, then a check is performed on the server to determine the time at which a change of the requested response arises. At the time of a change, a complete event-initiated response eA is generated and is transmitted to the requesting subscriber 4, 6 in one transmission process (second operation at S2). Thereafter, a check is further performed on the server to determine the time at which a fresh change arises. When a fresh change of this kind arises, a complete event-initiated response eA is again transmitted to the requesting subscriber 4, 6 in one transmission process (third operation at S3). FIG. 4 shows that in a fourth operation at S4, a further registration request rA, which may be a logoff request, is transmitted to the virtual machine VM. Thereafter, the transmission of the event-initiated responses eA ends.

LIST OF REFERENCE SYMBOLS 1 communication network
2 infotainment system
3 controller
4 first vehicle-based subscriber
5 second vehicle-based subscriber
6 third vehicle-based subscriber
7 first external subscriber
8 further external subscriber
9 stateless communication interfaces
10 communication network
D1 first data transmission
D2 second data transmission
D3 third data transmission
D4 fourth data transmission
VM virtual machine
cA client-based request
aA request-initiated response
eA event-initiated response
rA registration request
S1 first operation
S2 second operation
S3 third operation
S4 fourth operation

The invention claimed is:

1. A method for data transmission and operation among a plurality of subscribers including a first vehicle-based subscriber having a vehicle operating system, a second vehicle-based subscriber, and at least one further subscriber, wherein at least one of the first and second vehicle-based subscribers is formed on a vehicle infotainment system of a transportation vehicle and the other of the first and second vehicle-based subscribers is hosted by the same transportation vehicle, and the at least one further subscriber is remote to the same transportation vehicle, the method comprising:

forming, from the second vehicle-based subscriber, at least one virtual machine having an operating system different from the vehicle operating system of the first vehicle-based subscriber, wherein the at least one virtual machine forms part of a client-server communication network for communicating with the at least one further subscriber;

performing stateless communication between the second vehicle-based subscriber and the at least one further subscriber in the client-server communication network, such that communication is initiated by a client-based request by one of the subscribers acting as a client in accordance with a first transmission protocol in the client-server communication network, and such that communication is initiated by a server-based event by one of the subscribers acting as a server in accordance with a further transmission protocol, different from the first transmission protocol, in the client-server communication network, and such that the at least one further subscriber transmits persistent data that requires the operating system of the virtual machine different than the vehicle operating system of the first vehicle-based subscriber when communicating to the at least one virtual machine that acts as the server of the client-server communication network; and operating using the persistent data via the operating system of the virtual machine different than the vehicle operating system of the first vehicle-based subscriber, based on communication between the operating system of the virtual machine and the vehicle operating system of the first vehicle-based subscriber.

2. The method of claim 1, wherein the persistent data encode a service or an application.

3. The method of claim 1, wherein the at least one virtual machine acts as the client in the client-server communication network and the at least one further subscriber acts as the server of the client-server communication network.

4. The method of claim 1, wherein, in the client-server communication network, server to client communication is performed in accordance with a RESTful principle.

5. The method of claim 1, wherein the at least one further subscriber interfaces with the first and second vehicle-based subscribers via the client-server communication network formed by the at least one virtual machine.

6. A communication network for data transmission among a plurality of subscribers including a first vehicle-based subscriber that is a first vehicle-based subscriber having a vehicle operating system, a second vehicle-based subscriber that is a vehicle-based subscriber, the first and second vehicle-based subscribers being hosted on the same transportation vehicle, and at least one further subscriber remote to the same transportation vehicle, the communication network comprising:
  a vehicle infotainment system comprising each of the first and second vehicle-based subscribers, the vehicle infotainment system providing the vehicle operating system of the first vehicle-based subscriber; and
  at least one virtual machine formed by the second vehicle-based subscriber, wherein the at least one virtual machine forms part of a client-server communication network for communicating with the at least one further subscriber and having an operating system different from the vehicle operating system of the first vehicle-based subscriber,
  wherein stateless communication is performed between the second vehicle-based subscriber and the at least one further subscriber in the client-server communication network,
  wherein the stateless communication includes data transmission initiated by a client-based request by one of the of the subscribers acting as a client in the client-server communication network is performed in accordance with a first transmission protocol,
  wherein the stateless communication includes data transmission initiated by a server-based event by one of the subscribers acting as a server in the client-server communication network is performed in accordance with a further transmission protocol, different from the first transmission protocol,
  wherein the at least one further subscriber transmits persistent data that requires the operating system different than the vehicle operating system of the first vehicle-based subscriber when performing data transmission to the at least one virtual machine that acts as the server of the client-server communication network; and
  wherein operations are performed using the persistent data via the operating system of the virtual machine different than the vehicle operating system of the first vehicle-based subscriber, based on communication between the operating system of the virtual machine and the vehicle operating system of the first vehicle-based subscriber.

7. The communication network of claim 6, wherein the at least one virtual machine acts as the client in the client-server communication network and the at least one further subscriber acts as the server of the client-server communication network.

8. The communication network of claim 6, wherein client-server communication in the client-server communication network each is performed using a communication interface included in each of the second vehicle-based subscriber and the at least one further subscriber, wherein the communication interfaces are configured to perform stateless communication there between.

9. The communication network of claim 6, wherein client-server communication in the client-server communication network each is performed using a communication interface included in each of the second vehicle-based subscriber and the at least one further subscriber, wherein the communication interfaces are configured to perform communication between the subscribers in accordance with a RESTful principle.

10. A transportation vehicle comprising a communication network for data transmission among a plurality of subscribers including a first vehicle-based subscriber that is a first vehicle-based subscriber having a vehicle operating system, a second vehicle-based subscriber that is a vehicle-based subscriber, the first and second vehicle-based subscribers each hosted on the transportation vehicle, and at least one further subscriber that is remote to the transportation vehicle,
  wherein the communication network includes:
    a vehicle infotainment system comprising each of the first and second vehicle-based subscribers, the vehicle infotainment system providing the vehicle operating system of the first vehicle-based subscriber; and
    at least one virtual machine formed by the second vehicle-based subscriber, wherein the at least one virtual machine forms part of a client-server communication network for communicating with the at least one further subscriber and having an operating system different from the vehicle operating system of the first vehicle-based subscriber,
    wherein stateless communication is performed between the second vehicle-based subscriber and the at least one further subscriber in the client-server communication network, including data transmission initiated by a client-based request by on the of the subscribers acting as the client in the client-server communication network is performed in accordance with a first transmission protocol, and including data transmission initiated by a server-based event by on the of the subscribers acting as the server in the client-server communication network is performed in accordance with a further transmission protocol, different from the first transmission protocol,
    wherein the at least one further subscriber transmits persistent data that requires the operating system different than the vehicle operating system of the first vehicle-based subscriber when performing data transmission to the at least one virtual machine that acts as the server of the client-server communication network; and
    wherein operations are performed using the persistent data via the operating system of the virtual machine different than the vehicle operating system of the first vehicle-based subscriber, based on communication between the operating system of the virtual machine and the vehicle operating system of the first vehicle-based subscriber.

11. The vehicle of claim 10, wherein the at least one virtual machine acts as the client in the client-server communication network and the at least one further subscriber acts as the server of the client-server communication network.

12. The vehicle of claim 10, client-server communication in the client-server communication network each is performed using a communication interface included in each of the second vehicle-based subscriber and the at least one further subscriber, wherein the communication interfaces are configured to perform stateless communication therebetween.

13. The vehicle of claim 10, wherein client-server communication in the client-server communication network each is performed using a communication interface included in each of the second vehicle-based subscriber and the at least one further subscriber, wherein the communication interfaces are configured to perform communication between the subscribers in accordance with a RESTful principle.

14. The vehicle of claim 10, wherein the at least one additional subscriber interfaces with the first and second vehicle-based subscribers via the client-server communication network formed by the at least one virtual machine.

15. The vehicle of claim 10, wherein the at least one further subscriber includes a display screen configured to receive user input.

* * * * *